(12) United States Patent
Yan

(10) Patent No.: US 9,221,923 B2
(45) Date of Patent: Dec. 29, 2015

(54) COUPLED POLYMERS AND METHODS FOR MAKING SAME

(75) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 217 days.

(21) Appl. No.: 13/976,341

(22) PCT Filed: Dec. 30, 2011

(86) PCT No.: PCT/US2011/068186
§ 371 (c)(1),
(2), (4) Date: Jun. 26, 2013

(87) PCT Pub. No.: WO2012/092595
PCT Pub. Date: Jul. 5, 2012

(65) Prior Publication Data
US 2013/0274408 A1 Oct. 17, 2013

Related U.S. Application Data

(60) Provisional application No. 61/429,057, filed on Dec. 31, 2010.

(51) Int. Cl.
*C08F 8/24* (2006.01)
*C08F 8/42* (2006.01)
*B60C 1/00* (2006.01)
*C08F 36/06* (2006.01)
*C08L 21/00* (2006.01)
*C08C 19/44* (2006.01)
*C08L 15/00* (2006.01)
*C08L 19/00* (2006.01)
*C08G 77/442* (2006.01)
*C08L 83/10* (2006.01)
*C08L 9/06* (2006.01)

(52) U.S. Cl.
CPC ................ *C08F 8/42* (2013.01); *B60C 1/0016* (2013.01); *C08C 19/44* (2013.01); *C08F 36/06* (2013.01); *C08G 77/442* (2013.01); *C08L 15/00* (2013.01); *C08L 19/006* (2013.01); *C08L 21/00* (2013.01); *C08L 83/10* (2013.01); *C08L 9/06* (2013.01)

(58) Field of Classification Search
CPC ..... B60C 1/0016; C08C 19/144; C08F 36/06; C08F 8/42; C08G 77/442; C08L 15/00; C08L 19/006; C08L 21/00; C08L 83/10; C08L 9/06
USPC .................... 525/100, 342; 524/575
See application file for complete search history.

(56) References Cited

U.S. PATENT DOCUMENTS

| | | |
|---|---|---|
| 4,618,650 A | 10/1986 | Halasa et al. |
| 5,811,479 A | 9/1998 | Labauze |
| 6,013,718 A | 1/2000 | Cabioch et al. |
| 6,020,430 A | 2/2000 | Schwindeman et al. |
| 6,071,995 A | 6/2000 | Labauze |
| 6,558,805 B2 | 5/2003 | Khadir et al. |
| 6,593,429 B2 | 7/2003 | Kim et al. |
| 6,624,256 B2 | 9/2003 | Kwag et al. |
| 6,667,362 B2 | 12/2003 | Robert et al. |
| 6,900,263 B2 | 5/2005 | Hodge |
| 7,153,919 B2 | 12/2006 | Hogan et al. |
| 7,612,144 B2 | 11/2009 | Hogan et al. |
| 8,063,153 B2 | 11/2011 | Yan et al. |
| 2003/0018154 A1 | 1/2003 | Khadir et al. |
| 2004/0231905 A1 | 11/2004 | Kurita et al. |
| 2006/0030657 A1* | 2/2006 | Hogan et al. ............. 524/445 |
| 2007/0149744 A1* | 6/2007 | Yan et al. ................ 528/38 |
| 2008/0045664 A1 | 2/2008 | Sone et al. |
| 2009/0156728 A1 | 6/2009 | Ashiura et al. |
| 2009/0163675 A1 | 6/2009 | Chen et al. |
| 2010/0286348 A1 | 11/2010 | Pan et al. |

OTHER PUBLICATIONS

Official action dispatched by SIPO on Oct. 23, 2014, in CN appl. No. 201180062927—5 pages plus 5-pg. translation.
Park, Hamyong, Aug. 24, 2012 International Search Report with Written Opinion from PCT Application No. PCT/US2011/041421 (8 pages).
Extended search report in EP 11853033, mailed May 15, 2014—8 pp.

* cited by examiner

*Primary Examiner* — Ling Choi
*Assistant Examiner* — Chun-Cheng Wang
(74) *Attorney, Agent, or Firm* — Meredith E. Hooker; David G. Burleson

(57) ABSTRACT

Carbanionic polymer chains that contain polyene mer can be coupled after being reacted to include, at their respective termini, at least one, and preferably one, unit that is the radical of a cyclic polysiloxane. The coupled polymers are useful in preparing rubber compounds from which vulcanizates are made.

19 Claims, No Drawings

COUPLED POLYMERS AND METHODS FOR MAKING SAME

CROSS-REFERENCE TO RELATED APPLICATIONS

This is a national stage of international application no. PCT/US2011/068186, filed 30 Dec. 2011, which claims the benefit of U.S. provisional patent application 61/429,057, filed 31 Dec. 2010.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. (A reduction in hysteresis commonly is associated with a decrease in tan $\delta 0$ value at an elevated temperature, e.g., 50° or 60° C., while good wet traction performance commonly is considered to be associated with an increase in tan $\delta$ value at a low temperature, e.g., 0° C.)

Reduced hysteresis and traction are, to a great extent, competing considerations: treads made from compositions designed to provide good road traction usually exhibit increased rolling resistance and vice versa. Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s), which commonly results in reductions in hysteresis (see above). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

Polymers made by anionic initiation techniques frequently are coupled prior to use. Coupling can be effected by reacting two or more live (carbanionic) polymer chains with a coupling agent at or near the end of polymerization. Coupling can improve processability of such polymers and, in at least some cases, provide improved end use performance characteristics; for example, tire treads incorporating some tin-coupled polymers exhibit improved wear and reduced rolling resistance than treads incorporating similar but uncoupled polymers.

Commonly employed coupling agents include tin or silicon tetrahalides, e.g., $SnCl_4$, $SiCl_4$, etc. Such compounds can react with up to four live polymer chains. Such perfect stoichiometry is desirable but rarely achieved, however, because some of the coupling agent molecules can end up reacting with less than a stoichiometric number of live polymer chains. Increasing the amount of coupling agent can result in each coupling agent molecule having a less-than-stoichiometric amount of live polymer chains attaching thereto, while decreasing the amount of coupling agent can result in some live polymer chains remaining uncoupled. Maximizing the amount of polymer chains attached to each coupling agent compound while minimizing the number of free (uncoupled) polymer chains is desirable.

Complicating the foregoing is the fact that coupling efficiency of many types of coupling agents is affected by the identity and amount of polar compound(s) used in the polymerization (for purposes of modifying the microstructure of the polymer and, accordingly, its performance properties). Coupling efficiencies in batch processes that include polar modifiers typically are on the order of 50-60%, with even lower efficiencies being seen in continuous processes. See U.S. Pat. No. 6,489,403 for one method proposed for overcoming or ameliorating this reduction in efficiency.

Coupling reactions eliminate the possibility for post-polymerization functionalization of living polymers. Thus, to provide such polymers with terminal functionality, so-called functional initiators often are employed; see, e.g., U.S. Pat. Nos. 6,020,430 and 6,558,805 for two efforts in this regard.

SUMMARY

Provided herein are methods for coupling polymer chains. Where certain classes of functional initiators (for example, those defined below by general formulas (I)-(IV)) are used to provide carbanionic polymer chains, essentially any compound capable of reacting with two or more carbanionic polymers can be employed in the coupling reaction, while only those coupling agents free of halogen atoms and alkoxy groups are employed where the polymer chains do not include the radical of one of the foregoing initiators. Prior to the coupling reaction, some or all of the carbanionic polymer chains are provided at a terminus with the radical of at least one, preferably only one, cyclic polysiloxane. The structure of this intermediate, terminally functional living polymer chain is shown below in general formula (V).

Some, often all, of the polymer chains include polyene mer units. In certain embodiments, the polyenes can be conjugated dienes. The polyene mer-containing polymer can be substantially linear.

Compositions, including vulcanizates, that include particulate fillers and coupled polymers also are provided, as are methods of providing and using such compositions. One such composition includes particulate fillers that include carbon black and less than 50% (by wt.) silica.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"ring system" means a single ring or two or more fused rings or rings linked by a single bond, with the proviso that each ring includes unsaturation;

"terminus" means an end of a polymeric chain;

"terminally active" means a polymer with a living terminus; and

"terminal moiety" means a group or functionality located at a terminus.

Throughout this document, all values given in the form of percentages are weight percentages unless the surrounding text explicitly indicates a contrary intention. All referenced patent documents, as well as the entirety of the aforementioned priority application, are incorporated herein by reference.

DETAILED DESCRIPTION OF ILLUSTRATIVE EMBODIMENTS

The following describes the coupling of living (carbanionic) polymer chains after terminal functionalization with one or more cyclic polysiloxanes. The polymers include at least one, sometimes only one, terminal moiety resulting from attachment of the cyclic polysiloxane, i.e., a terminal unit that is the radical of a cyclic polysiloxane.

The polymers include mer units derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from ~10 to ~80%, optionally from ~25 to ~65%, sometimes can be desirable. A polymer that has an overall 1,2-microstructure of no more than ~50%, typically no more than ~45%, more typically no more than ~40%, even more typically no more than ~35%, and commonly no more than ~30%, based on total polyene content, is considered to be "substantially linear". For certain end use applications, however, keeping the content of 1,2-linkages even lower—e.g., to less than ~7%, less than 5%, less than 2%, or less than 1%—can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Useful polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

Solution polymerization typically involves an initiator such as an organolithium compound, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

So-called functionalized initiators also can be useful and, at least in some instances, preferred. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Other potentially useful functional initiators include sulfur atom-containing cyclic compounds such as those described in U.S. Pat. No. 7,612,144, which are defined by the general formula

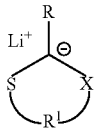 (I)

where R is a substituted or unsubstituted $C_1$-$C_6$ trialkylsilyl group, $C_1$-$C_{20}$ alkyl group, $C_4$-$C_{20}$ cycloalkyl group, $C_6$-$C_{20}$ aryl group, or a thienyl, furyl, or pyridyl group; $R^1$ is a $C_2$-$C_8$ alkylene group; and X is S, O or NR with R being defined as before.

Also potentially useful as functional initiators are cyclic compounds such as those described in U.S. Pat. Publ. No. 2011/0009583 (int'l patent publ. WO 2009/117329), defined by the general formula

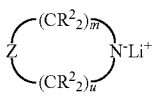 (II)

where each $R^2$ independently is H or a $C_1$-$C_6$ alkyl group; m is an integer of from 0 to 4 inclusive and n is an integer of from 1 to 4 inclusive, with the proviso that m+n≥2; and Z is $NR^3$, $PR^4$, $SiR^4R^5$, $SnR^4R^5$, or $CR^4R^6$ wherein $R^3$ is a substituted or unsubstituted alkyl, aryl, aralkyl, alkaryl or cycloalkyl group that is free of active hydrogen atoms (but which optionally can include at least one N, P, O, S, Si or Sn atom), $R^4$ is an $R^3$ group which includes at least one N, P, O, S, Si or Sn atom, $R^5$ is a $C_1$-$C_6$ alkyl group, and $R^6$ is $R^2$ or, together with $R^4$ and the C atom to which it is bonded, forms a substituted or unsubstituted cycloalkyl group.

Also potentially useful as functional initiators are compounds such as those described in U.S. Pat. Publ. No. 2010/0286348 A1, defined by the general formula $$R^7AQ\text{-}M \quad \text{(III)}$$

where M is an alkali metal atom, preferably Li, Na or K; $R^7$ is a substituted or unsubstituted aryl group (which can be a single phenyl-type group or a ring system) having at least one $OR^8$ substituent group where each $R^8$ is a hydrolyzable protecting group that also is nonreactive toward M; A is a single bond or a substituted or unsubstituted alkylene (acyclic or cyclic) or arylene group; and Q is a group bonded to M through a C, N or Sn atom.

Also potentially useful as functional initiators are cyclic compounds such as those described in int'l patent publ. WO 2011/008501, defined by the general formula

 (IV)

where M is defined as above; $R^9$ is a hydrocarbyl group such as, for example, an alkyl (typically $C_2$-$C_{10}$ alkyl), cycloalkyl (typically $C_2$-$C_{10}$ cycloalkyl) or aryl group; and $R^{10}$ is an $R^7$ group or a phenyl group substituted at the para position with a linear or cyclic group that contains at least one O, S, N, P or Si atom. The latter can be provided by reacting an alkali metal atom-containing compound (i.e., $R^9M$) with a para-substituted styrenic compound such as, for example,

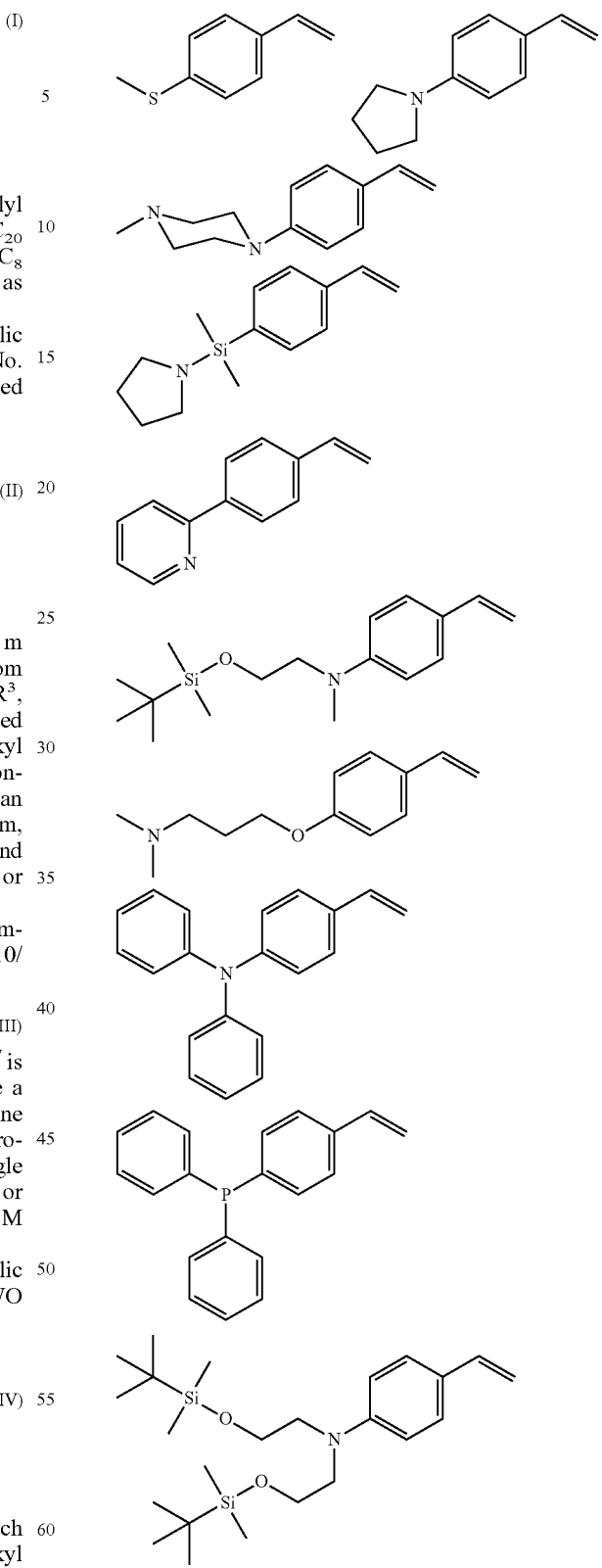

Specific examples of compounds within the class defined by formula (IV) particularly suitable for use as initiators for polymerization of ethylenically unsaturated monomers, where $R^{19}$ is an $R^7$ group, have the general formula

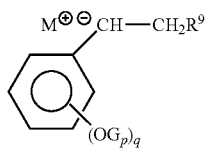

(IVa)

where M and $R^9$ are defined as above, each $G_p$ independently is a protecting group, and q is an integer of from 1 to 5 inclusive.

The foregoing are intended to be representative of the types of functional initiators that can be used in certain aspects of the present method.

The amount of initiator employed can vary widely depending on the particular initiator and the desired characteristics of the resulting polymer. For each 100 g of monomer present, sufficient initiator to provide ~0.1 to ~100 mmol alkali metal atom, typically from ~0.33 to ~10 mmol alkali metal atom, is employed.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to ~150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Generally, polymers made according to anionic techniques can have a $M_n$ of from ~50,000 to ~500,000 Daltons, although in certain embodiments the number average molecular weight can range from ~75,000 to ~250,000 Daltons or even from ~90,000 to ~150,000 Daltons.

The aforedescribed polymerization process advantageously results in polymer chains that possess reactive (living) terminals, which can undergo further reaction(s) which can enhance the interaction between the polymer chains and particulate fillers in rubber compounds, thereby improving the mechanical and dynamic properties of vulcanizates made therefrom.

One such reaction is accomplished by introducing a cyclic polysiloxane into a vessel that contains a living polymer. (The term "vessel" can be the reactor in which the polymerization was conducted or, if desired, a separate container to which the polymer cement has been transferred.) Examples of cyclic polysiloxanes that can be used in this reaction are those that can deliver up to 6, preferably 3 to 4, repeating siloxane units. Also preferred are those where at least some, preferably all, of the Si atoms are substituted with a $C_1$-$C_6$ organic (preferably hydrocarbyl) substituent, preferably a $C_1$-$C_3$ alkyl group. Particularly preferred due to availability and cost are hexamethylcyclotrisiloxane (H-3S) and octamethylcyclotetrasiloxane (O-4S).

The product of the foregoing reaction can be represented as

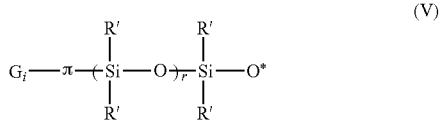

(V)

where $G_i$ represents the radical of a functional initiator; $\pi$ represents a polymer chain that includes polyene mer; each R' independently is a $C_1$-$C_6$ organic substituent; and r≥2, typically 2≤r≤19, and preferably 2≤r≤7. In some embodiments, the radical of only a single cyclic siloxane becomes attached to the polymer chain which, in the case of H-3S and O-4S, results in r=2 or r=3, respectively. In these situations, the repeating siloxane units constitute a relatively minor proportion of the overall polymer chain; in general, the repeating siloxane units typically have a collective molecular weight of no more than ~400 g/mol, more typically no more than ~360 g/mol, even more typically no more than ~340 g/mol, and most commonly no more than ~320 g/mol.

No particularly unusual reaction conditions are believed necessary to accomplish the foregoing reaction, i.e., the conditions used to provide the living polymer typically are adequate to open the ring of the cyclic structure and allow the resulting radical to attach to the polymer terminus. Temperatures at which this reaction can be performed generally range from ~45° to ~80° C., typically between ~50° and ~75° C.; more detailed exemplary conditions can be found below in the examples.

The radical of a cyclic polysiloxane provides an anionic terminal moiety capable of further reaction. In the present case, polymer chains with terminal functionalities derived from (i.e., that are radicals of) one or more cyclic polysiloxanes can be coupled by reaction with any of a variety of compounds such as metal polyhalides, metal alkoxides, silanes, polyisocyanates, and the like; several specific compounds that exemplify the types of potentially useful classes are set forth in the examples that follow. Some of these are free of halogen atoms, and these form one preferred class of coupling agents. Others are free of alkoxy groups, and these constitute another preferred class.

Reaction of a coupling agent with a macromolecule as defined by formula (V) can occur over a wide range of temperatures and pressures, and the conditions used in the preceding steps typically are adequate for this reaction as well. This reaction can occur in the same or different vessel as the one employed for the preceding step.

The amount of coupling agent employed in the coupling reaction step typically is a stoichiometric ratio (e.g., 1:2 up to 1:z where z is the valence of the atom involved in the coupling reaction) based on the amount of initiator employed in the polymerization, which generally correlates to the amount of living (carbanionic) polymer chains available. Where fewer than z polymer chains are attached to the coupling agent radical, the remaining valences can be occupied by any of a variety of groups (e.g., (cyclo)alkyl, aryl, hydroxyl, amine, etc.) or even to another coupling agent radical, typically via an intermediate heteroatom (e.g., O or S).

Although typically not required, if desired, quenching can be conducted by stirring an active hydrogen atom-containing compound, such as an alcohol or acid, into the polymer cement for up to ~120 minutes at temperatures of from ~25° to ~150° C.

Solvent can be removed from the quenched polymer cement by any of a variety of techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any type of tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Penna.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr. In certain embodiments, the amount of silica relative to the total amount of particulate filler can be below 50%, below ~45%, below ~40%, or even below ~35%.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide the reader with detailed conditions and materials that can be useful in the practice of the present invention.

EXAMPLES

In the following examples, dried glass vessels previously sealed with extracted septum liners and perforated crown caps under a positive $N_2$ purge were used for all preparations unless otherwise indicated. Butadiene solution (22.4% in hexane), styrene solution (33.5% in hexane), hexane, n-butyllithium (1.6 M in hexane), 2,2-bis(2'-tetrahydrofuryl)-propane (1.6 M solution in hexane, stored over $CaH_2$), and butylated hydroxytoluene (BHT) solution in hexane were used.

2-(4-dimethylamino)phenyl-1,3-dithiane (DMAPDT) was synthesized using a procedure similar to that set forth as Example 21 in U.S. Pat. No. 7,612,144.

Commercially available reagents and starting materials included the following, all of which were used without further purification unless otherwise noted in a specific example:
  from Acros Organics (Geel, Belgium): H-3S, O-4S, hexamethyleneimine (HMI), and $SiCl_4$;
  from Gelest, Inc. (Morrisville, Pa.): tetrakis(methylethylketoximo)silane, methyltris(methylethylketoximo)silane, 2,2-dimethoxy-1-thia-2-silacyclopentane, $SnCl_4$, titanium n-butoxide, and tetraethyl orthosilicate (TEOS).

Example 1

Control Interpolymer

To a $N_2$-purged reactor equipped with a stirrer was added 1.82 kg hexane, 0.45 kg styrene solution, and 2.67 kg butadiene solution. The reactor was charged with ~4.1 mL n-butyllithium solution, followed by 1.2 mL 2,2-bis(2'-tetrahydrofuryl)propane solution. The reactor jacket was heated to 50° C. and, after ~30 min., the batch temperature peaked at ~65° C.

After an additional ~30 minutes, polymer cement was dropped into isopropanol containing BHT. Coagulated polymer was drum dried. Properties of this polymer (sample 1) are summarized below in Table 1, where $M_p$ represents peak molecular weight.

Examples 2-5

Cyclic Siloxane-Reacted Interpolymers, Coupled

The procedure from Example 1 was essentially repeated. After adding identical amounts of solvent and monomer solutions, the reactor was charged with ~4.7 mL n-butyllithium solution, followed by 1.2 mL 2,2-bis(2'-tetrahydrofuryl)propane solution. The reactor jacket was heated to 50° C. and, after ~33 minutes, the batch temperature peaked at ~64° C.

After an additional ~30 minutes, ~8.0 mL H-3S solution (10 M in hexane) was added to the reactor. This polymer cement was agitated at 50° C. for another ~30 minutes before portions were transferred to glass bottles. To the bottles were added, respectively, hexane solutions of
  sample 2—0.25 M $SnCl_4$ (2:1)
  sample 3—2.93 M titanium n-butoxide (1:1)
  sample 4—4.42 M TEOS (1:1)
  sample 5—6.1 M hexamethylene diisocyanate (1:1)
(with the ratios in parentheses representing the molar ratio of lithium initiator, which essentially corresponds to the number of live polymer chains, to amount of coupling agent). These bottles were agitated for ~30 minutes in a 50° C. water bath before their respective contents were dropped (separately) into isopropanol containing BHT, coagulated, and drum dried similarly to the control polymer from Example 1.

Properties of these functionalized interpolymers, along with those of the non-functionalized control (sample 1), are summarized below in the following table.

TABLE 1

Properties of polymers from Examples 1-5

|  | 1 | 2 | 3 | 4 | 5 |
|---|---|---|---|---|---|
| $M_n$ (kg/mol) | 106 | 89 | 90 | 105 | 102 |
| $M_w/M_n$ | 1.05 | 1.04 | 1.03 | 2.35 | 1.13 |
| $M_p$ (kg/mol) | 113 | 94 | 94 | 94 | 94 |
| $T_g$ (° C.) | −37.7 | −37.6 | −38.5 | −38.2 | −37.9 |
| % coupling | 0.00 | 0.92 | 0.66 | 19.99 | 23.64 |

Examples 6-10

Cyclic Siloxane-Reacted Interpolymers, Si Coupled

The procedure from Example 1 was essentially repeated. After adding identical amounts of solvent and monomer solutions, the reactor was charged with ~4.0 mL n-butyllithium solution, followed by 1.2 mL 2,2-bis(2'-tetrahydrofuryl)propane solution. The reactor jacket was heated to 50° C. and, after ~303 minutes, the batch temperature peaked at ~64° C.

After an additional ~30 minutes, ~6.3 mL H-3S solution (10 M in hexane) was added to the reactor. This polymer cement was agitated at 50° C. for another ~30 minutes before portions were transferred to glass bottles. Isopropanol was added to one bottle (sample 6, comparative), while varying amounts of 1.0 M $SiCl_4$ (in hexane) were added to the other bottles:

sample 7—1:1
sample 8—2:1
sample 9—3:1
sample 10—4:1
with each of the noted ratios having the same meaning as set forth above in connection with Examples 2-5. Each bottle was agitated for ~30 minutes in a 50° C. water bath before their respective contents were quenched, coagulated and drum dried as above. Properties of these interpolymers are summarized below in the following table.

TABLE 2

Properties of polymers from Examples 6-10

|  | 6 | 7 | 8 | 9 | 10 |
|---|---|---|---|---|---|
| $M_n$ (kg/mol) | 109 | 217 | 208 | 194 | 172 |
| $M_w/M_n$ | 1.04 | 2.24 | 1.52 | 1.24 | 1.26 |
| $M_p$ (kg/mol) | 115 | 826 | 230 | 231 | 233 |
| $T_g$ (° C.) | −34.9 | −35.4 | −35.7 | −35.4 | −35.5 |
| % coupling | 0.49 | 62.32 | 82.29 | 79.46 | 65.77 |

Examples 11-14

Cyclic Siloxane-Reacted Interpolymers, Functional Initiator, Coupled

The procedure from Example 1 was substantially repeated, with the exception that a functional initiator was employed in place of n-butyllithium.

To a room temperature solution of 1.38 g DMAPDT in 10 mL THF and 1 mL triethanolamine in a $N_2$ purged and dried glass bottle was added 3.8 mL n-butyllithium solution followed by 1.0 mL 2,2-bis(2'-tetrahydrofuryl)propane solution. The color of the solution immediately turned to red.

The initiator solution was charged to a reactor containing identical amounts of solvent and monomer solutions to those set forth above in Example 1. After ~1.0 mL 2,2-bis(2'-tetrahydrofuryl)propane solution was added to the reactor, the reactor jacket was heated to 50° C. After ~24 minutes, the batch temperature peaked at ~70° C.

After an additional ~30 minutes, ~6.1 mL H-3S solution (10 M in hexane) was added to the reactor. This polymer cement was agitated at 50° C. for another ~30 minutes before portions were transferred to glass bottles to which were added 1.25 M tetrakis(methylethylketoximo)silane in toluene:
sample 11—1:1
sample 12—2:1
sample 13—3:1
sample 14—4:1
with each of the noted ratios having the same meaning as set forth above in connection with Examples 2-5. Each bottle was agitated for ~30 minutes in a 50° C. water bath before their respective contents were quenched, coagulated and drum dried as in previous examples. Properties of these interpolymers are summarized below in the following table.

TABLE 3

Properties of polymers from Examples 11-14

|  | 11 | 12 | 13 | 14 |
|---|---|---|---|---|
| $M_n$ (kg/mol) | 240 | 213 | 210 | 212 |
| $M_w/M_n$ | 5.65 | 3.60 | 5.18 | 1.96 |
| $M_p$ (kg/mol) | 136 | 136 | 136 | 136 |
| $T_g$ (° C.) | −36.8 | −37.6 | −36.5 | −37.0 |
| % coupling | 63.73 | 54.60 | 57.91 | 61.15 |

Examples 15-18

Cyclic Siloxane-Reacted Interpolymers, Functional Initiator, Coupled

The procedure from Examples 11-14 was substantially repeated. To a room temperature solution of 1.38 g DMAPDT in 10 mL THF and 1 mL triethanolamine in a $N_2$ purged and dried glass bottle was added 3.9 mL n-butyllithium solution followed by 1.0 mL 2,2-bis(2'-tetrahydrofuryl)propane solution. The red-colored solution immediately was charged to a reactor containing the same amounts of solvent and monomer solutions used in the previous examples. After ~1.0 mL 2,2-bis(2'-tetrahydrofuryl)propane solution was added to the reactor, the reactor jacket was heated to 50° C.; the batch temperature peaked at ~70° C. after ~24 minutes.

After an additional ~30 minutes, ~6.3 mL H-3S solution (10 M in hexane) was added to the reactor. This polymer cement was agitated at 50° C. for another ~30 minutes before portions were transferred to glass bottles. Isopropanol was added to one bottle (sample 15, comparative), while varying amounts of 1.0 M $SiCl_4$ (in hexane) were added to the other bottles:
sample 16—1:1
sample 17—2:1
sample 18—3:1
with each of the noted ratios having the same meaning as set forth above in connection with Examples 2-5. Each bottle was agitated for ~30 minutes in a 50° C. water bath before their respective contents were quenched, coagulated and drum dried as in previous examples. Properties of these interpolymers are summarized below in the following table.

TABLE 4

Properties of polymers from Examples 15-18

|  | 15 | 16 | 17 | 18 |
|---|---|---|---|---|
| $M_n$ (kg/mol) | 121 | 142 | 191 | 223 |
| $M_w/M_n$ | 1.08 | 1.45 | 1.41 | 1.38 |
| $M_p$ (kg/mol) | 124 | 125 | 252 | 251 |
| $T_g$ (° C.) | −35.2 | −35.1 | −35.5 | −35.0 |
| % coupling | 6.51 | 28.49 | 65.91 | 80.10 |

Cold flow testing was performed using a Scott™ tester (PTES Equipment Services, Inc.; Johnston, R.I.). Samples were prepared by melt pressing 2.5 g of polymer at 100° C. for 20 minutes in a mold using a preheated press. The resulting cylindrical samples, which had a uniform thickness of ~12 mm, were allowed to cool to room temperature before being removed from the mold. Samples were placed individually under the weight of a 5 kg calibrated weight. Sample thicknesses was recorded as a function of time for ~30 minutes (measured from time that the weight was released), with sample thickness at the conclusion of that time generally being considered an acceptable indicator of resistance to cold flow for this type of polymer.

Results of cold flow testing were as follows (where C-1 is a styrene/butadiene interpolymer prepared with a n-butyllithium initiator, similar to sample 1, and C-2 is a styrene/butadiene interpolymer prepared with a n-butyllithium initiator and terminally reacted with H-3S so as to provide a small number of cyclic siloxane-derived capping units, similar to sample 6), with more retained thickness representing better resistance to cold flow:

18>17>>16>15>C-2>C-1.

Examples 19-24

Filled Compositions and Vulcanizates

Several polymers similar to ones produced in the foregoing Examples were used to make filled compositions (i.e., rubber compounds containing particulate filler(s)), specifically, 19—sample 1,
20—sample 6,
21—sample 15,
22—sample 17, and
23—sample 18.

The polymer employed in Example 24 was prepared by first reacting a styrene/butadiene interpolymer with H-3 S (as in the other examples), followed by reaction with a 3:1 ratio of a 3-aminopropyltrialkoxysilane (with the ratio representing the same initiator-to-coupling agent relative amounts as in previous examples); see examples 9, 14 and 20-21 from U.S. Pat. Publ. 2007/0149744 A1 for additional details. Properties of the polymers used to make the filled compositions and vulcanizates are summarized below in Table 5.

TABLE 5

Properties of polymers

|  | 19 | 20 | 21 | 22 | 23 | 24 |
|---|---|---|---|---|---|---|
| $M_n$ (kg/mol) | 106 | 109 | 103 | 140 | 132 | 104 |
| $T_g$ (° C.) | −37.7 | −34.9 | −39.2 | −38.9 | −38.7 | −40.0 |
| % coupling | 0.0 | 0.5 | 4.8 | 48.2 | 41.3 | 8.9 |

Filled compositions were prepared using the formulations shown in Table 6a (carbon black as sole particulate filler) and Table 6b (silica as sole particulate filler) where N-phenyl-N'-(1,3-dimethylbutyl)-p-phenylenediamine (6PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic compounds.

TABLE 6a

Carbon black compound formulation

|  | Amount (phr) |
|---|---|
| Masterbatch |  |
| synthesized polymer | 100 |
| carbon black (N343 type) | 50 |
| wax | 2 |
| 6PPD | 0.95 |
| stearic acid | 2 |
| black oil | 10 |
| Final |  |
| sulfur | 1.5 |
| ZnO | 2.5 |

TABLE 6a-continued

Carbon black compound formulation

|  | Amount (phr) |
|---|---|
| TBBS | 0.5 |
| MBTS | 0.5 |
| DPG | 0.3 |
| TOTAL | 170.25 |

TABLE 6b

Silica compound formulation

|  | Amount (phr) |
|---|---|
| Masterbatch |  |
| synthetic polymer | 80 |
| natural rubber | 20 |
| silica | 52.5 |
| wax | 2 |
| 6PPD | 0.95 |
| stearic acid | 2 |
| black oil | 10 |
| Re-mill |  |
| 60% disulfide silane on carrier | 5 |
| silica | 2.5 |
| Final |  |
| sulfur | 1.5 |
| ZnO | 2.5 |
| MBTS | 2.0 |
| TBBS | 0.7 |
| DPG | 1.4 |
| TOTAL | 183.05 |

Tables 7a (carbon black) and 7b (silica) below show results of physical testing on these compounds, as well as vulcanizates prepared by curing the compounds for ~15 minutes at 171° C. (For the "Temp. sweep" line, the top row of data are from measurements at 0° C. while the bottom row are from measurements at 60° C.) Mooney viscosity ($ML_{1+4}$) values were determined with an Alpha Technologies™ Mooney viscometer (large rotor) using a one-minute warm-up time and a four-minute running time; tensile mechanical properties were determined using the standard procedure described in ASTM-D412; Payne effect (ΔG', i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_X$ is modulus at X % elongation, $T_b$ is tensile strength at break, and $E_b$ is percent elongation at break.

TABLE 7a

Compound and vulcanizate properties (carbon black)

| | 19 | 20 | 21 | 22 | 23 | 24 |
|---|---|---|---|---|---|---|
| MDR2000 @ 171° C. (final) | | | | | | |
| ML (kg·cm) | 0.57 | 0.88 | 0.86 | 1.74 | 1.52 | 1.10 |
| MH (kg·cm) | 13.90 | 16.66 | 18.72 | 18.48 | 18.69 | 18.07 |
| $t_{90}$ (min) | 7.49 | 7.84 | 6.19 | 5.19 | 5.49 | 5.29 |
| $ML_{1+4}$ @ 100° C. (final) | 12.7 | 25.9 | 23.1 | 41.8 | 37.9 | 30.0 |
| Tensile @ 23° C. (final, unaged) | | | | | | |
| $M_{50}$ (MPa) | 1.71 | 1.86 | 1.94 | 1.91 | 1.93 | 1.93 |
| $M_{300}$ (MPa) | 11.18 | 13.01 | 14.13 | 16.52 | 16.35 | 15.66 |
| $T_b$ (MPa) | 15.9 | 17.5 | 17.2 | 20.0 | 20.6 | 16.9 |
| $E_b$ (%) | 408 | 384 | 363 | 356 | 366 | 321 |
| Tensile @ 100° C. (final, unaged) | | | | | | |
| $M_{50}$ (MPa) | 1.28 | 1.61 | 1.72 | 1.81 | 1.85 | 1.80 |
| $M_{200}$ (MPa) | 5.70 | 7.05 | 7.70 | 9.03 | 9.07 | — |
| $T_b$ (MPa) | 7.6 | 8.8 | 8.0 | 10.3 | 10.1 | 7.2 |
| $E_b$ (%) | 252 | 240 | 207 | 224 | 219 | 179 |
| Strain sweep (60° C., 10 Hz, final) | | | | | | |
| G' @ 5% strain (MPa) | 3.010 | 2.884 | 3.116 | 2.706 | 2.816 | 2.499 |
| G" @ 5% strain (MPa) | 0.802 | 0.691 | 0.656 | 0.444 | 0.472 | 0.367 |
| tan δ @ 5% strain | 0.2665 | 0.2395 | 0.2104 | 0.1640 | 0.1676 | 0.1468 |
| ΔG' (MPa) | 4.522 | 3.819 | 3.851 | 2.106 | 2.291 | 1.516 |
| Temp. sweep (2% strain, 10 Hz, final) | | | | | | |
| G' (MPa) | 17.604 | 17.982 | 16.958 | 13.243 | 14.223 | 14.601 |
| | 6.127 | 5.952 | 6.497 | 5.355 | 5.858 | 5.726 |
| G" (MPa) | 6.557 | 8.084 | 6.148 | 5.068 | 5.362 | 5.522 |
| | 1.507 | 1.357 | 1.307 | 0.925 | 0.977 | 1.001 |
| tan δ | 0.3719 | 0.4484 | 0.3618 | 0.3821 | 0.3765 | 0.3775 |
| | 0.2459 | 0.2279 | 0.2012 | 0.1730 | 0.1667 | 0.1748 |
| Peak tan δ | 0.7566 | 0.7774 | 0.7807 | 0.8332 | 0.8249 | 0.8358 |
| Dynastat tan δ (60° C., final) | 0.2410 | 0.2164 | 0.1950 | 0.1463 | 0.1457 | 0.1358 |
| Bound rubber (%) | 4.5 | 11.0 | 10.3 | 21.8 | 33.9 | 26.8 |

TABLE 7b

Compound and vulcanizate properties (silica)

| | 19 | 20 | 21 | 22 | 23 | 24 |
|---|---|---|---|---|---|---|
| MDR2000 @ 171° C. (final) | | | | | | |
| ML (kg·cm) | 1.33 | 1.92 | 2.25 | 2.77 | 2.64 | 2.54 |
| MH (kg·cm) | 22.14 | 16.54 | 18.49 | 20.34 | 19.89 | 18.59 |
| $t_{90}$ (min) | 8.34 | 6.53 | 5.55 | 5.40 | 5.76 | 5.62 |
| $ML_{1+4}$ @ 100° C. (final) | 13.5 | 40.7 | 57.7 | 60.9 | 58.6 | 62.1 |
| Tensile @ 23° C. (final, unaged) | | | | | | |
| $M_{50}$ (MPa) | 1.97 | 1.51 | 1.61 | 1.73 | 1.76 | 1.51 |
| $M_{200}$ (MPa) | 7.40 | 8.63 | 9.30 | 9.63 | 9.58 | 9.28 |
| $T_b$ (MPa) | 14.5 | 15.0 | 14.0 | 15.9 | 18.0 | 15.7 |
| $E_b$ (%) | 338 | 282 | 256 | 277 | 304 | 278 |
| Tensile @ 100° C. (final, unaged) | | | | | | |
| $M_{50}$ (MPa) | 1.71 | 1.53 | 1.76 | 1.89 | 1.89 | 1.80 |
| $M_{100}$ (MPa) | 3.11 | 3.08 | 3.56 | 3.76 | 3.78 | 3.54 |
| $T_b$ (MPa) | 7.7 | 6.8 | 5.9 | 7.3 | 7.8 | 6.2 |
| $E_b$ (%) | 215 | 175 | 146 | 165 | 171 | 151 |
| Strain sweep (60° C., 10 Hz, final) | | | | | | |
| G' @ 5% strain (MPa) | 3.979 | 1.855 | 1.974 | 2.263 | 2.275 | 2.076 |
| G" @ 5% strain (MPa) | 0.704 | 0.147 | 0.112 | 0.141 | 0.132 | 0.123 |
| tan δ @ 5% strain | 0.1769 | 0.0792 | 0.0568 | 0.0621 | 0.0580 | 0.0590 |
| ΔG' (MPa) | 4.707 | 0.309 | 0.286 | 0.505 | 0.439 | 0.352 |
| Temp. sweep (2% strain, 10 Hz, final) | | | | | | |
| G' (MPa) | 15.332 | 5.293 | 5.171 | 6.359 | 6.241 | 5.068 |
| | 7.619 | 2.408 | 2.922 | 3.532 | 3.512 | 2.884 |
| G" (MPa) | 4.476 | 2.660 | 2.031 | 2.387 | 2.353 | 1.907 |
| | 1.131 | 0.192 | 0.172 | 0.223 | 0.224 | 0.176 |

TABLE 7b-continued

| Compound and vulcanizate properties (silica) | | | | | | |
|---|---|---|---|---|---|---|
| | 19 | 20 | 21 | 22 | 23 | 24 |
| tan δ | 0.2915 | 0.4994 | 0.3912 | 0.3736 | 0.3749 | 0.3750 |
| | 0.1484 | 0.0798 | 0.0589 | 0.0633 | 0.0637 | 0.0609 |
| Peak tan δ | 0.7320 | 1.0767 | 1.0497 | 0.9439 | 0.9698 | 1.0778 |
| Dynastat tan δ (60° C., final) | 0.1438 | 0.0682 | 0.0475 | 0.0519 | 0.0489 | 0.0495 |
| Bound rubber (%) | 19.7 | 83.5 | 84.3 | 73.6 | 78.3 | 86.4 |

A plot of tan δ vs. strain (60° C., 10 Hz, from 0-15% strain) for vulcanizates prepared from a carbon black-filled composition showed the following trend (with lower being better): 24<23≈22<21<20<19.

A plot of tan δ vs. strain (60° C., 10 Hz, from 0-15% strain) for vulcanizates prepared from a silica-filled composition showed the following trend (with lower being better): 21≈22≈23≈24<20<<19.

A plot of G' vs. strain (60° C., 10 Hz, from 0-15% strain) for vulcanizates prepared from a silica-filled composition showed the following trend (with lower being better): 20<21<24<22≈23<<19.

A plot of tan δ vs. temperature (10 Hz, from about −80° to ~100° C.) for vulcanizates prepared from a silica-filled composition showed that each of Examples 20-24 had higher tan δ peaks which occurred at higher temperatures than a vulcanizate incorporating a control polymer (Example 19). This is believed to be predictive of better wet traction (snow and ice) performance.

Examples 25-29

Cyclic Siloxane-Reacted Interpolymers, Functional Initiator, Isocyanatosilane Coupled The procedure from Examples 2-5 was essentially repeated. After adding ~1.71 kg hexane, ~0.45 kg styrene solution and ~2.79 kg butadiene solution, the reactor was charged with ~4.1 mL n-butyllithium solution, followed by 2.0 mL 2,2-bis(2'-tetrahydrofuryl)propane solution. The reactor jacket was heated to 50° C. and, after ~33 minutes, the batch temperature peaked at ~68° C.

After an additional ~30 minutes, ~6.6 mL H-3S solution (1.0 M in hexane) was added to the reactor. This polymer cement was agitated at 50° C. for another ~30 minutes before portions were transferred to glass bottles. One bottle (sample 25) was set aside while, to the other four bottles, were added neat tetraisocyanatosilane in an amount sufficient to provide the following molar ratios (relative to lithium initiator, which essentially corresponds to the number of live polymer chains, to amount of coupling agent):

sample 26—1:1
sample 27—2:1
sample 28—3:1
sample 29—4:1

These bottles were agitated for ~30 minutes in a 50° C. water bath before their respective contents were dropped (separately) into isopropanol containing BHT, coagulated, and drum dried as in previous examples.

Properties of the functionalized interpolymers (samples 26-29), along with those of the non-functionalized control (sample 25), are summarized below in the following table.

TABLE 8

| Properties of polymers from Examples 25-29 | | | | | |
|---|---|---|---|---|---|
| | 25 | 26 | 27 | 28 | 29 |
| $M_n$ (kg/mol) | 110 | 204 | 188 | 154 | 136 |
| $M_w/M_n$ | 1.06 | 1.54 | 1.52 | 1.42 | 1.31 |
| $M_p$ (kg/mol) | 116 | 427 | 416 | 112 | 112 |
| $T_g$ (° C.) | −41.0 | −41.0 | −41.9 | −41.3 | −41.2 |
| % coupling | 2.23 | 70.58 | 63.83 | 50.12 | 37.81 |

Filled compositions were prepared using the formulation shown in Table 6b above. These were processed and tested as in Examples 19-24. In comparing the tan δ vs. strain (60° C., 10 Hz from 0-15% strain) curves for the vulcanizates, a clear trend is observed (with lower being better): 29<28<27<26<<25.

That which is claimed is:

1. A method for coupling polymers, said method comprising:
    a) using a functional initiator to anionically initiate polymerization of a monomer system that comprises at least one type of polyene so as to provide a plurality of living polymer chains,
    b) reacting at least some of said living polymer chains with one or more cyclic polysiloxanes so as to provide terminally functionalized living polymer chains, and
    c) allowing a polyvalent compound to react with the termini of two or more of said terminally functionalized living polymer chains so as to provide coupled polymers,
    said method being characterized by one of the following:
        (1) said polyvalent compound being free of halogen atoms and alkoxy groups and being selected from silanes and polyisocyanates, or
        (2) said functional initiator being defined by one of the general formulas (I) through (III):

(I)

(II)

(III)

where
    each $R^2$ independently is H or a $C_1$-$C_6$ alkyl group;
    m is an integer of from 0 to 4 inclusive and n is an integer of from 1 to 4 inclusive, with the proviso that m+n≥2;
    Z is $NR^3$, $PR^4$, $SiR^4R^5$, $SnR^4R^5$, or $CR^4R^6$ wherein R³ is a substituted or unsubstituted alkyl, aryl, aralkyl, alkaryl or cycloalkyl group that is free of active hydrogen atoms but which optionally can include at least one N, P, O, S, Si or Sn atom, R⁴ is an R³ group which includes at least one N, P, O, S, Si or Sn atom, R⁵ is a $C_1$-$C_6$ alkyl group, and R⁶ is R² or, together with R⁴ and the C atom to which it is bonded, forms a substituted or unsubstituted cycloalkyl group;

M is an alkali metal atom;

R⁷ is a substituted or unsubstituted aryl group having at least one OR⁸ substituent group where each R⁸ is a hydrolyzable protecting group that also is nonreactive toward M;

A is a single bond or a substituted or unsubstituted alkylene or arylene group;

Q is a group bonded to M through a C, N or Sn atom;

R⁹ is a hydrocarbyl group; and

R¹⁰ is R⁷ or a phenyl group substituted at the para position with a linear or cyclic group that contains at least one O, S, N, P or Si atom.

2. The method of claim 1 wherein each of said terminally functionalized living polymer chains, prior to coupling, is defined by the general formula

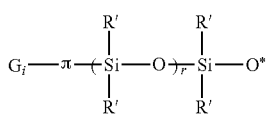

where
G is the radical of a functional initiator;
π is a polymer chain that includes polyene mer;
each R' independently is a $C_1$-$C_6$ organic substituent; and
r is an integer of from 2 to 19 inclusive.

3. The method of claim 2 wherein r is an integer of from 2 to 7 inclusive.

4. The method of claim 2 wherein r is 2 or 3.

5. The method of claim 4 wherein the collective molecular weight of the repeating siloxane units is no more than 400 g/mol.

6. The method of claim 4 wherein the collective molecular weight of the repeating siloxane units is no more than 360 g/mol.

7. The method of claim 4 wherein the collective molecular weight of the repeating siloxane units is no more than 340 g/mol.

8. The method of claim 4 wherein the collective molecular weight of the repeating siloxane units is no more than 320 g/mol.

9. The method of claim 1 wherein said method is characterized by said polyvalent compound being free of halogen atoms and alkoxy groups and being selected from silanes and polyisocyanates.

10. The method of claim 1 wherein said method is characterized by said functional initiator being defined by formula (III) where R¹⁰ is an R⁷ group.

11. The method of claim 10 wherein said R⁷ group comprises at least two OR⁸ substituent groups.

12. The method of claim 10 wherein R⁷ is a phenyl group.

13. The method of claim 12 wherein said phenyl group comprises at least two OR⁸ substituent groups.

14. The method of claim 12 wherein said functional initiator is the reaction product of an alkali metal atom-containing compound with a styrenic compound selected from

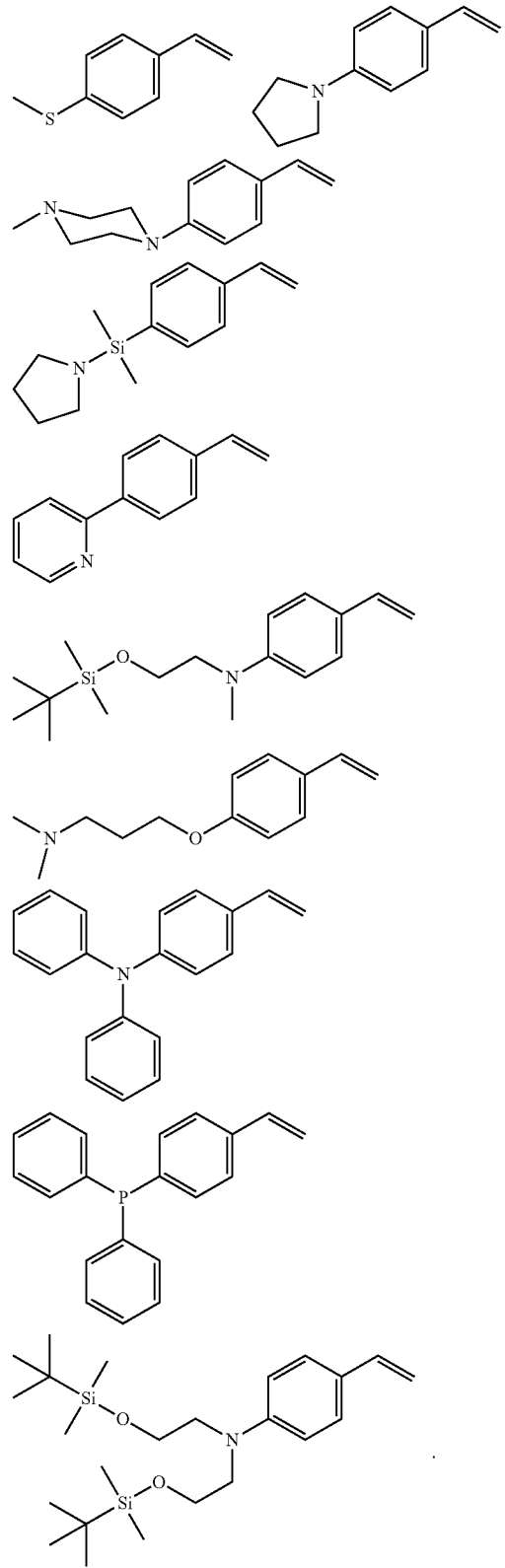

15. The method of claim 1 wherein said method is characterized by said functional initiator being defined by formula (II) where $R^7$ comprises at least two $OR^8$ substituent groups.

16. The method of claim 1 wherein said method is characterized by said functional initiator being defined by formula (II) where $R^7$ is a substituted or unsubstituted phenyl group having at least one $OR^8$ substituent group.

17. The method of claim 16 wherein $R^7$ comprises at least two $OR^8$ substituent groups.

18. The method of claim 1 further comprising blending said coupled polymers with particulate fillers comprising carbon black and less than 50% by weight silica.

19. The method of claim 1 wherein said method is characterized by said functional initiator being defined by formula (III) where $R^{10}$ is a phenyl group substituted at the para position with a linear or cyclic group that contains at least one 0, S, N, P or Si atom.

* * * * *